Patented May 28, 1946

2,400,915

UNITED STATES PATENT OFFICE 2,400,915

TREATMENT OF FUELS EMPLOYED IN DIESEL ENGINES AND FURNACE OIL BURNERS

John M. Campbell, Detroit, Mich., assignor to General Motors Corporation, Detroit, Mich., a corporation of Delaware No Drawing. Application January 8, 1943, Serial No. 471,700

3 Claims. (Cl. 44—69)

This invention has to do with fuels and more particularly the treatment of combustible hydrocarbon fuels such as employed in Diesel engines and furnace oil burners so that the tendency to form sooty and carbonaceous deposits on the walls of, and other parts within and leading from, the combustion chamber is reduced or suppressed.

It is known that sooty deposits consisting largely of carbon are formed from time to time on the injector tips, piston parts and other combustion chamber parts of Diesel engines and on the walls of furnace combustion chambers and on the flues and stack thereof, when operating on oil as a fuel. The present invention has as its principal object the reduction or elimination of this tendency with consequent improvement in operating conditions.

I have found that small amounts of various lead compounds such as lead oxides, chloride, bromide, sulfate, sulfide, etc., exert an unusual and unexpected catalytic effect on the ignition of carbon of the sooty deposits and lower appreciably the temperature at which the carbon will ignite and continue to burn. In accordance with the invention one or more lead compounds conveniently are added to the fuel oil in the form of oil soluble compounds of lead and the Diesel engine or oil burner is operated on the fuel containing the lead in the same way that present fuels are used therein. During combustion the soluble lead compound which is of organic composition is decomposed to form inorganic compounds of lead which are highly dispersed and exert a catalytic effect on the oxidation of any carbonaceous deposits that are present.

A preferred embodiment of the invention includes the addition of tetraethyl lead or other lead alkyl to the fuel oil as the lead compound. Where tetraethyl lead is employed in furnace oil or in Diesel fuel a small amount usually less than .02% by volume (0.76 c. c. per gallon of fuel oil) is added to the fuel oil.

In the case of Diesel operation, the addition of lead tetraethyl to Diesel fuel is contrary to all previous teaching with regard to the preparation of desirable characteristics in Diesel fuel. This is because of the fact that lead tetraethyl acts as an ignition suppressor in preventing knock in gasoline engines and is known to lower the ignition quality of Diesel fuel as measured in terms of cetane number. While all this is true, I have found that it is possible to add very small amounts of lead tetraethyl to Diesel fuel with beneficial results. This is because the lead tetraethyl is present in such small amounts that it does not materially lower the cetane number and yet is present in sufficient quantity to effect catalytic ignition of carbonaceous deposits in the combustion space.

Concentrations of tetraethyl lead varying from 0.5 to 2.0 c. c. per gallon have been used successfully in the prevention of carbon deposits on injector tips of a Diesel engine. It is preferred, however, to use the minimum concentration of lead tetraethyl necessary to accomplish the desired results since an excess, as pointed out above, has an undesirable effect on other characteristics of the fuel. Under most conditions, therefore, less than .02% by volume of lead tetraethyl is employed.

Lead tetraethyl is at present preferred because it is the cheapest and most readily available oil soluble compound of lead but other oil soluble compounds of lead are within the scope of the invention.

I claim:

1. A fuel for use in Diesel engines or oil burners which consists of hydrocarbin fuel oil constituents and a small amount of tetraethyl lead, said small amount being not greater than .02% of the fuel by volume.

2. A fuel for furnace oil burners which includes hydrocarbon fuel oil constituents and a small amount of tetraethyl lead, said small amount being not greater than about .02% by volume.

3. A fuel for Diesel engines which includes hydrocarbon fuel oil constituents and a small amount of tetraethyl lead, said small amount being not greater than about .02% by volume.

JOHN M. CAMPBELL.